(12) United States Patent
Shimada et al.

(10) Patent No.: US 6,341,682 B1
(45) Date of Patent: Jan. 29, 2002

(54) HYDRAULIC POWER TRANSMISSION JOINT

(75) Inventors: Kazuhisa Shimada; Tadahiko Kato; Masaki Nakamura, all of Shizuoka; Toshiharu Takasaki, Kanagawa; Hirotaka Kusukawa, Machida; Shigeo Murata, Kanagawa, all of (JP)

(73) Assignees: Fujiunivance Co.,, Shizuoka; Nissan Motor Co., Ltd., Kanagawa, both of (JP)

( * ) Notice: Subject to any disclaimer, the term of this patent is extended or adjusted under 35 U.S.C. 154(b) by 0 days.

(21) Appl. No.: 09/556,834

(22) Filed: Apr. 21, 2000

(30) Foreign Application Priority Data

Apr. 26, 1999 (JP) .......................................... 11/117910

(51) Int. Cl.[7] .............................................. F16D 31/02
(52) U.S. Cl. ........................ 192/59; 192/103 F; 464/27
(58) Field of Search ............................... 192/59, 103 F; 464/24, 27; 91/485, 499

(56) References Cited

U.S. PATENT DOCUMENTS 5,103,642 A * 4/1992 Suzuki et al. ................. 60/413
5,297,994 A * 3/1994 Suzuki et al. ................. 464/27
5,706,658 A * 1/1998 Kato et al. ..................... 60/487
6,257,387 B1 * 7/2001 Shimada et al. .............. 192/59

FOREIGN PATENT DOCUMENTS

JP          3-38433 A  *  2/1991

* cited by examiner

Primary Examiner—Richard M. Lorence
(74) Attorney, Agent, or Firm—Wenderoth, Lind & Ponack, L.L.P.

(57) ABSTRACT

A joint includes therein a valve serving to cut off torque transmitted from a front wheel associated driving shaft to a rear wheel associated driven shaft by the action of a weight based on a centrifugal force when a predetermined number of rotations is reached. The valve is coupled to a rotor or a housing connected to the driven shaft so that the rotations of the valves are in synchronism with rotations of the driven shaft. For this reason, the number of rotations of the valve is determined by the number of rotations of the rear wheel associated with the driven shaft, allowing the torque to be cut off depending on the vehicle velocity.

3 Claims, 7 Drawing Sheets

HYDRAULIC POWER TRANSMISSION JOINT

BACKGROUND OF THE INVENTION

1. Field of the Invention

The present invention relates generally to a hydraulic power transmission joint for motor vehicles, for use in the distribution of a driving force to front and rear wheels, and more particularly to a hydraulic power transmission joint cutting off torque without any influence of rotational differences between the front and rear wheels.

2. Description of the Related Arts

Conventional hydraulic power transmission joints are known from e.g., U.S. Pat. Nos. 5,706,658 and 5,983,635. Such a hydraulic power transmission joint is used in a fashion as shown in FIG. 1 for example.

FIG. 1 illustrates an example of a hydraulic power transmission joint being currently developed by the inventors of the present application.

Referring to FIG. 1, a propeller shaft 101 connecting directly with front wheels is coupled too a companion flange 102 to which is coupled the hydraulic power transmission joint generally designated as 122. The hydraulic power transmission joint 122 comprises a housing shank 104 formed with a cam face 103 and fixedly inserted into the inner periphery of the companion flange 102, and a housing 105 secured by welding to the housing shank 104. The housing shank 104 is supported via a front bearing 106 by a differential gear case 107. A main shaft 108 acting as an output shaft connects with a drive pinion gear 109 associated with a rear differential gear. A rotor 110 is fitted via splines to the main shaft 108 and is rotatably housed in the housing 105. The rotor 110 is provided with a plurality of axially extending plunger chambers 111 which accomodate plungers. 112 reciprocatively under a pressing force of return springs 113, with the plungers 112 being operated by the cam face 103 upon the relative rotations between the two shafts. The rotor 110 is formed with an intake/discharge hole 114 leading to the plunger chambers 111. A rotary valive 115 is provided with a discharge port and an intake port (neither of which are shown) which are capable of communicating with the intake/discharge hole 114. The rotary valve 115 has an orifice (not shown) for generating a flow resistance by flow of oil discharged by the displacement of the plungers 112. The rotary valve 115 is further provided with a weight 116 for cutting off torque. A bearing retainer 117 is securely press fitted to the housing 105 and is positioned by a snap ring 118. Needle bearings 119 and 120 are interposed between the bearing retainer 117 and the rotary valve 115 and between the bearing retainer 117 and the main shaft 108, respectively. An accumulator piston 121 is further provided for absorbing thermal expansion and contraction of oil residing within the joint.

Such a hydraulic power transmission joint 122 is arranged as shown in FIG. 2 and generates torque hydraulically as a function of the rotational-speed differences between the front and rear wheels. More specifically, the hydraulic power transmission joint 122 is interposed between a front differential gear 123 and a rear differential gear 124, with the propeller shaft 101 acting as a driving shaft being coupled to the hydraulic power transmission joint 122. The front differential gear 123 is interposed between front driving wheels 125 and 126. The rear differential gear 124 is interposed between rear driven wheels 127 and 128.

In the event that tires having diameters have been mounted on the front driving wheels 125 and 126 and on the rear dirven wheels 127 and 128, the rotational-speed difference of the hydraulic power transmission joint 122 may increase accordingly as the vehicle velocity rises, with the result that torque may increase and accumulate within the front and rear differential gears 123 and 124, adding to the running resistance. In order to solve this problem, as illustrated in FIG. 3, there is proposed a valve which is provided within the hyrdraulic power transmission joint 122 and which has a weight 116 operating depending on the vehicle velocity (centrifugal force) for torque cutoff. More specifically, a rotary valve 115 is spline mounted within the housing 105 connecting directly with the propeller shaft 101, so as to rotate jointly with the housing 105. A weight 116 is provided within the rotary valve 115. In response to the number of rotations (centrifugal force), the weight 116 rotates around its center of rotation in the center of rotation in the direction indicated by an arrow A, so as to open a high-pressure oil drain portion 130 for draining off the high-pressure oil within the plunger chambers. on the vehicle velocity (centrifugal force) for torque cutoff. More specifically, a rotary valve 115 is spline mounted within the housing 105 connecting directly with the propeller shaft 101, so as to rotate jointly with the housing 105. A weight 116 is provided within the rotary valve 115. In response to the number of rotations (centrifugal force), the weight 116 rotates around its center of rotation in the direction indicated by an arrow A, so as to open a high-pressure oil drain portion 130 for draining off the high-pressure oil within the plunger chambers to cut off torque.

Due to such a vehicle velocity (centrifugal force), dependent torque is cutoff by the operation of the weight provided within the hydraulic power transmission joint. However, the weight may work early and cut off the torque even at a low vehicle velocity, e.g., upon the escape from any difficult situations. More specifically, when in stuck, only the front wheels acting as the driving wheel sand the propeller shaft rotate at a higher speed, with the rotary valve 115 connecting directly with the propeller shaft, whereupon the weight 116 may work to cut off the torque transmission to the rear wheel side, making an escape from sandy or muddy spots difficult.

SUMMARY OF THE INVENTION

According to the present invention there is provided a hydraulic power transmission joint capable of cutting off torque depending on the vehicle velocity without any influence of rotational differences between front and rear wheels.

The present invention is directed to a hydraulic power transmission joint disposed between a driving shaft and a driven shaft which are capable of relative rotations, for transmitting torque depending on rotational-speed differences between the two shafts. According to a first aspect of the present invention, such a hydraulic power transmission joint comprises a housing coupled to the driving shaft and having a cam face formed on the inner side of the housing; a rotor coupled to the driven shaft and rotatably housed in the housing, the rotor including a plurality of axially extending plunger chambers; a plurality of plungers each accommodated reciprocatively under a pressing force of a return spring in each of the plurality of plunger chambers, the plurality of plungers being operated by the cam face upon relative rotations between the two shafts; an orifice causing oil discharged by a displacement of the plunger to create a flow resistance to impart a high pressure to the interior of the plunger chamber, the orifice allowing torque transmitted from the housing to the rotor to be generated by a reaction force of the plunger;

a valve which when a predetermined number of rotations is reached, operates to cut off torque; and a coupling member for coupling the rotor connecting to the driven shaft and the valve together, the coupling member allowing rotations of the valve to be in synchronism with rotations of the driven shaft.

In this case, the valve may include a weight which when a predetermined number of rotations are reached, rotates around its center of rotation by a centrifugal force to drain off a high-pressure oil residing within the plunger chamber. Preferably, the housing connects with a driving shaft in the form of a propeller shaft extending from a front differential gear, and the rotor connects with an input shaft of a rear differential gear.

According to the present invention having such a configuration, the number of rotations at which the weight works can be determined by the driven shaft associated with the rear wheels by virtue of the coupling member for coupling the rotor connecting with the rear wheel driven shaft and the valve together and due to the synchronism of rotations of the valve with rotations of the rear wheel driven shaft. Thus, it is possible to cut off torque depending on the actual vehicle velocity without being affected by the rotational-speed differences between the front and rear wheels. As a result, torque to be transmitted to the rear wheels is prevented from being cut off, e.g., upon the escape from any difficult situations.

According to a second aspect of the present invention, there is provided a hydraulic power transmission joint disposed between a driving shaft and a driven shaft which are capable of relative rotations, for transmitting torque depending on rotational-speed differences between the two shafts. The hydraulic power transmission joint comprises a housing coupled to the driven shaft and having a cam face formed on the inner side of the housing; a rotor coupled to the driving shaft rotatably housed in the housing, the rotor including a plurality of axially extending plunger chambers; a plurality of plungers each accomodated reciprocatively under a pressing force of a return spring in each of the plurality of plunger chambers, the plungers being operated by the cam face upon relative rotations between the two shafts; an orifice causing oil discharged by a displacement of the plunger to create a flow resistance to impart a high pressure to the interior of the plunger chamber, the orifice allowing torque transmitted from the rotor to the housing to be generated by a reaction force of the plunger; a valve which when a predetermined number of rotations is reached, operates to cut off torque; and a fitting structure for fitting the valve into the interior of the housing connecting to the driven shaft, the fitting structure allowing rotations of he valve to be in synchronism with rotations of the driven shaft.

Herein, the valve may include a weight which when a predetermined number of rotations are reached, rotates around its center of rotation by a centrifugal force to drain off a high-pressure oil residing within the plunger chamber. Preferably, the housing connects with a driving shaft in the form of a propeller shaft extending from a front differential gear, and the rotor connects with an input shaft of a rear differential gear.

In this case as well, the number of rotations at which the weight works can be determined by to rotations of the driven shaft associated with the rear wheels by virtue of the fitting valve into the housing connecting with the rear wheel driven shaft and due to the synchronism of rotations of the valve with rotations of the rear wheel driven shaft. Thus, it is possible to cut off torque depending on the actual vehicle velocity without being affected by the rotational-speed differences between the front and rear wheels. As a result, torque to be transmitted to the rear wheels is prevented from being cut off, e.g., upon the escape from any difficult situations.

The above and other objects, aspects, features and advantages of the present invention will become more apparent from the following detailed description with reference to the accompanying drawings.

DETAILED DESCRIPTION OF THE PREFERRED EMBODIMENTS

Figure 4:
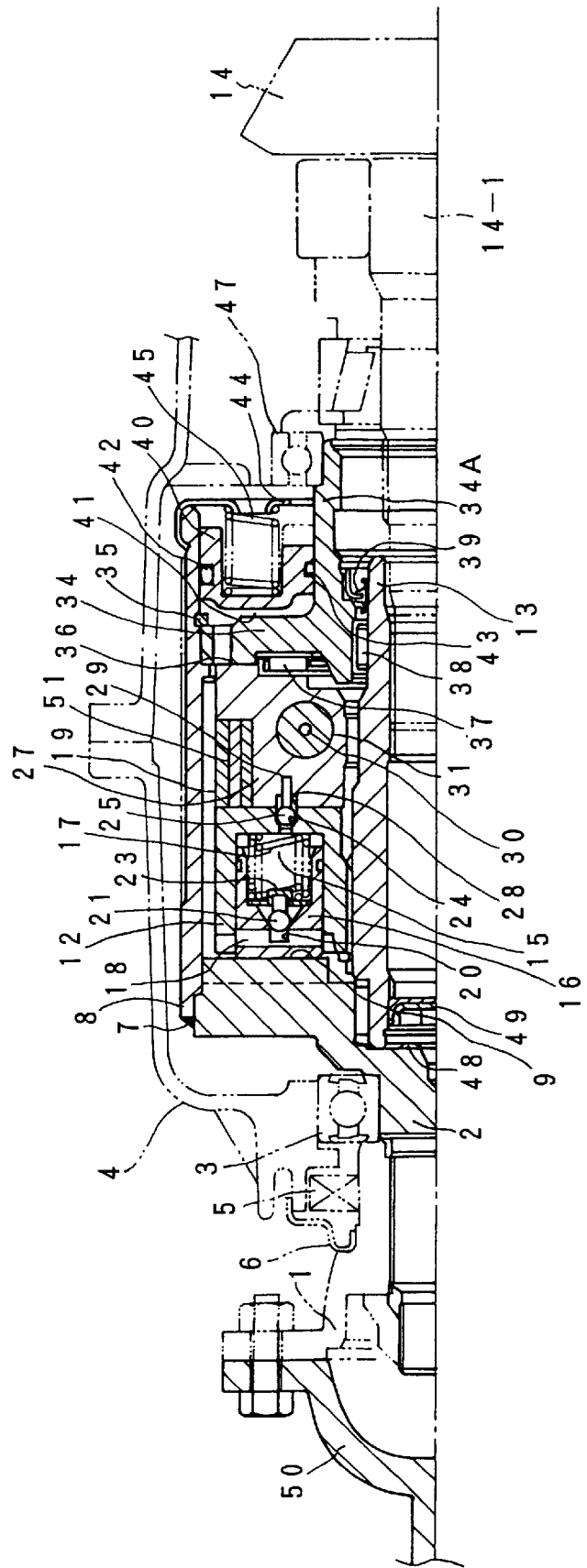
FIG. 4 is a half section of an embodiment of the present invention.
Figure 5:
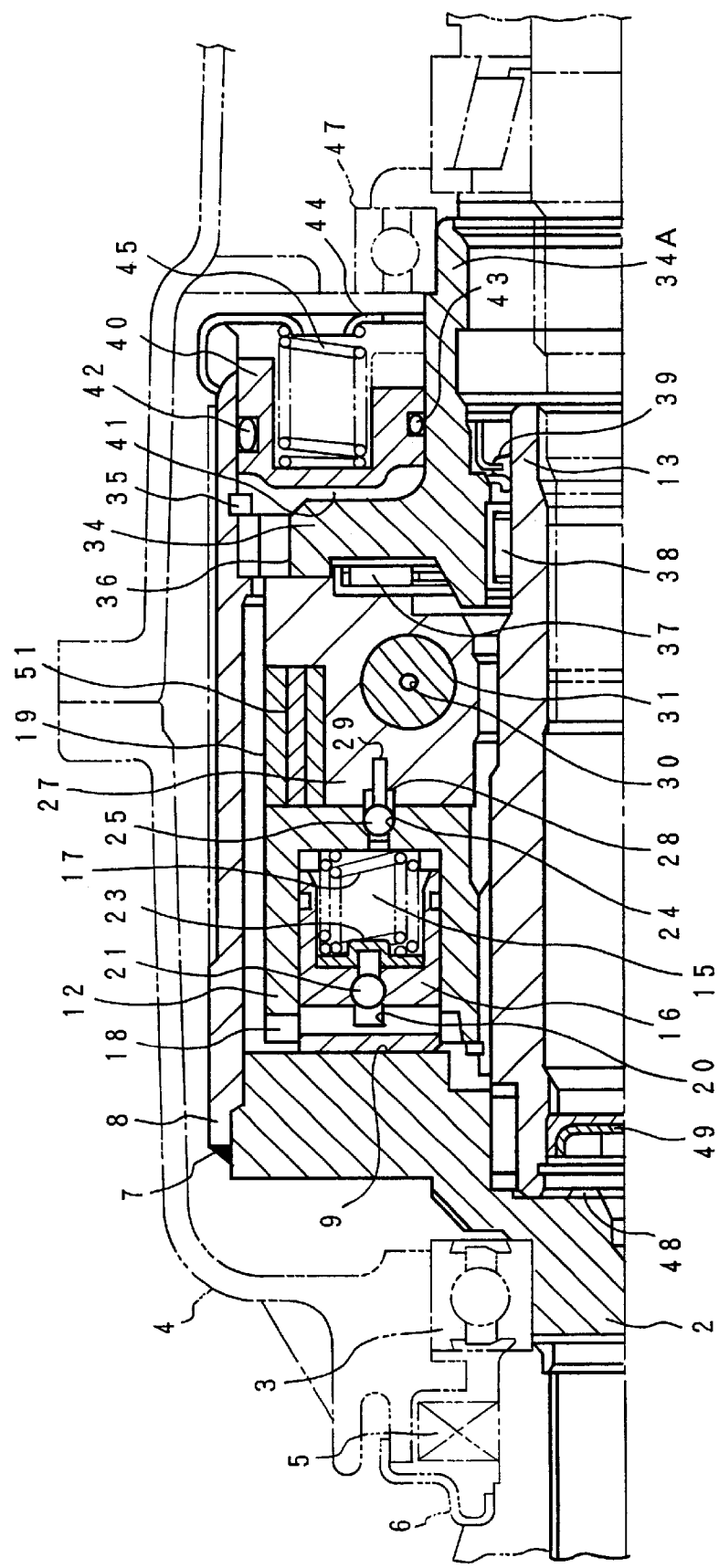
FIG. 5 is an enlarged half section of the major part of FIG. 4.

FIG. 4 is a half section of an embodiment of the present invention, of which major parts are illustrated in FIG. 5 is an enlarged and exclusive manner. A companion flange 1 is coupled to a propeller shaft 50 associated with a front wheel driving shaft. A housing shank 2 is inserted into the companion flange 1 and is spline fitted to the companion flange 1. The housing shank 2 has on its outer periphery a front bearing 3 by way of which the housing rod 2 is supported on a differential gear case 4. Between the differential gear case 4 and the companion flange 1 are provided a seal member 5 and a cover 6 which prevent, in cooperation, dust or other foreign particles from entering, and which prevent differential gear oil from flowing out. A housing 8 is secured at a weld 7 to the housing shank 2 and has on its inner side surface a cam face 9 having two or more raised portions. The housing shank 2 serves as a cam by this cam face 9. secured at a weld 7 to the housing shaft 2 which is provided on its inner side surface with a cam face 9 having two or more raised portions. The housing shaft 2 serves as a cam using this cam face 9.

A rotor 12 is rotatably housed in the housing 8. The rotor 12 engages with a main shaft 13 associated with a rear wheel driven shaft, for rotations in conjunction with the main shaft 13. The main shaft 13 fixedly receives a shaft 14-1 of a drive pinion gear 14 associated with a rear differential gear so that the main shaft 13 can rotate jointly with the drive pinion gear 14 acting as a rear input differential gear.

The rotor 12 is provided with a plurality of axially extending plunger chambers 15 which accommodate a plurality of plungers 16 slidably by way of return springs 17. An intake passage 18 is formed toward the head of the plunger 16 and leads to a low-pressure chamber 19. The intake passage 18 and the plunger chamber 15 communicate with each other via a communication hole 20 adapted to be opened or closed by a one way valve 21 for intake in the form of a ball. The interior of the plunger chamber 15 is formed with a valve seat on which the one way valve 21 is seated. A check plug 23 is disposed on the stepped portion of the valve seat, with a check spring not shown being interposed between the check plug 23 and the one way valve 21, for pressing and positioning the one way valve 21. The return spring 17 intervenes between the check plug 23 and the bottom of the rotor 12. The rotor 12 is formed with a discharge hole 24 which opens to the plunger chamber 15. A one way valve 25 for discharge in the form of a ball is disposed on the discharge hole 24. The discharge hole 24 is formed with a valve seat on which the one way valve 25 is seated.

Figure 1:
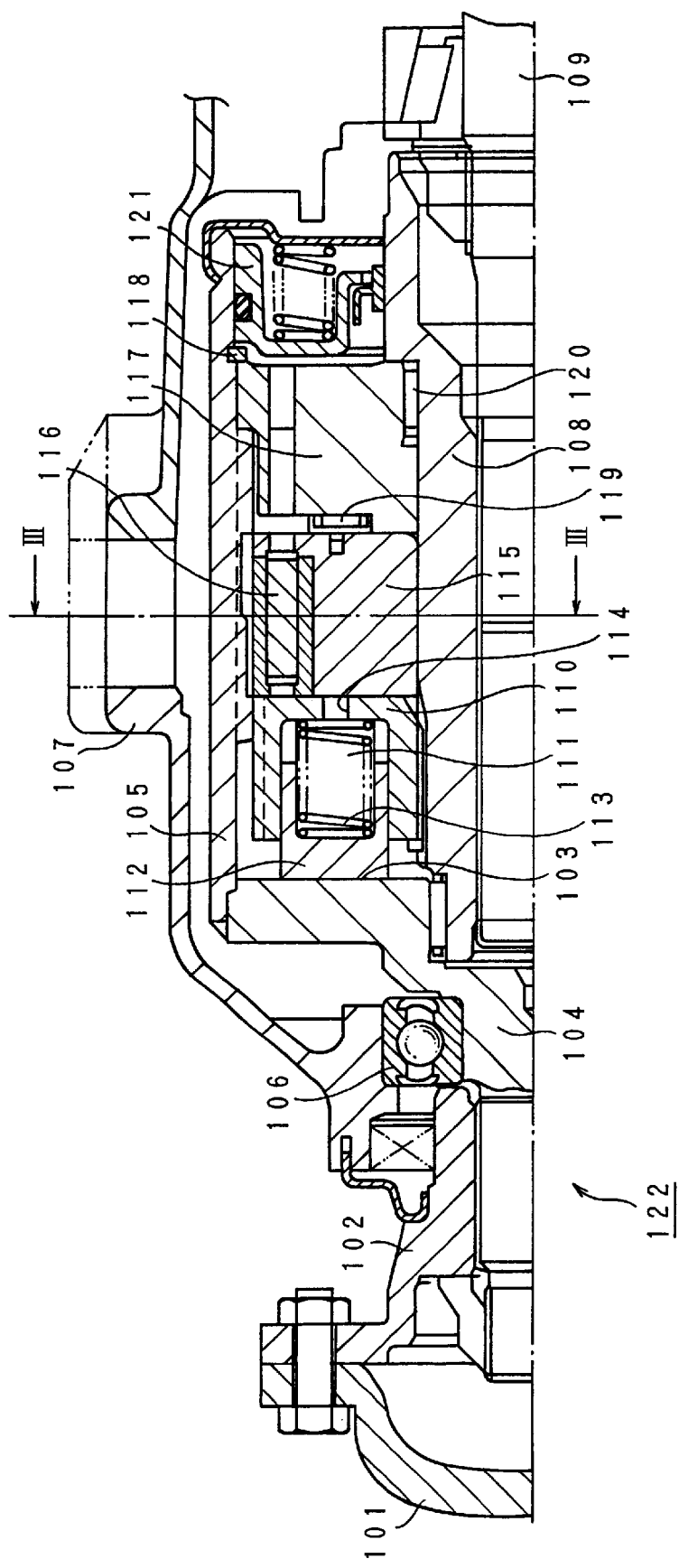
FIG. 1 is a half section of a hydraulic power transmission joint under development by the inventors of the present application.
Figure 2:
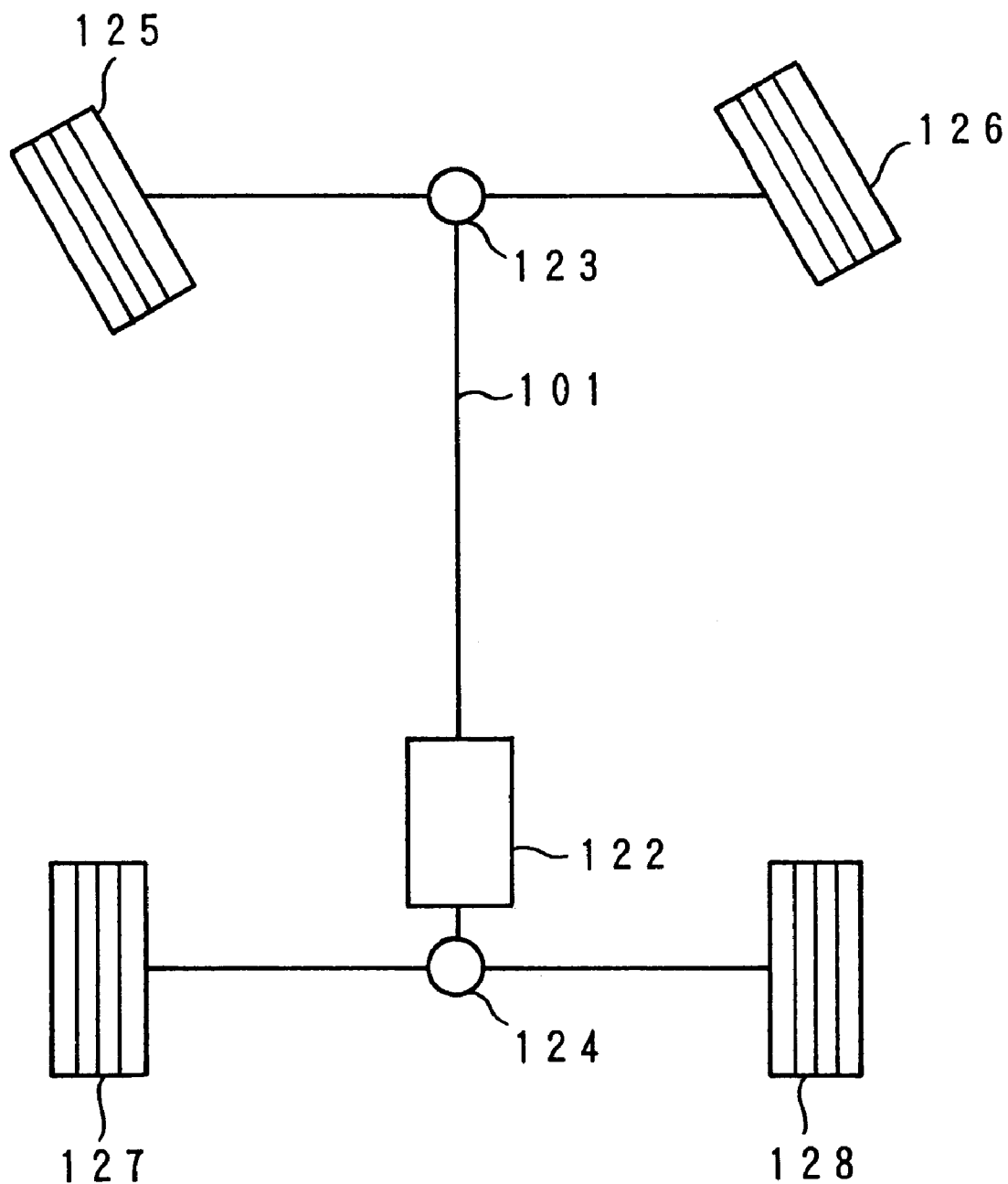
FIG. 2 is an explanatory diagram of the arrangement of the joint in a vehicle.
Figure 3:
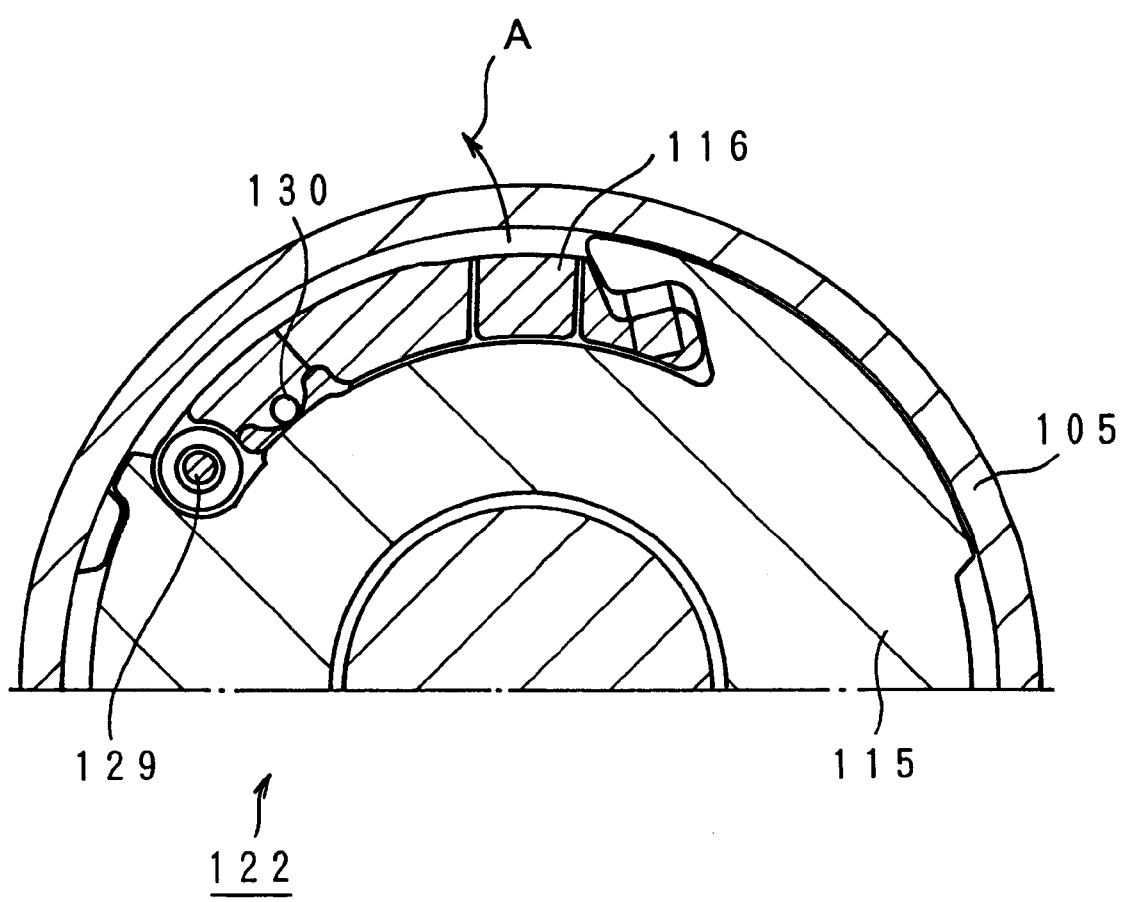
FIG. 3 is a sectional view taken along a line III—III of FIG. 1.

A valve 27 for torque cut is formed with a high-pressure chamber 28 which leads to the discharge hole 24 of the rotor 12. The valve 27 is provided with a restriction member 29 projecting into the high-pressure chamber 28, the restriction member 29 serving to position the one way valve 25 in place. The valve 27 is provided with an orifice member 31 having an orifice 30 which opens to the high-pressure chamber 28. The valve 27 is provided with a weight 51 which operates in response to the vehicle velocity (centrifugal force) to drain off high-pressure oil within the plunger chamber 15 to cut off the transmission torque to the rear wheel driven shaft. The weight 51 has the same structure as one shown in FIG. 3.

When the plunger 16 is in its intake stroke, the one way valve 21 located at the head of the plunger 16 is opened, allowing oil to flow through the low-pressure chamber 19, the intake passage 18 and the communication hole 20 into the plunger chamber 15. At that time, the one way valve 25 for discharge disposed on the discharge hole 24 closes, blocking up any backward flow of oil from the high-pressure chamber 28. When the plunger 16 is in its discharge stroke, the one way valve 25 on the discharge side is opened, permitting oil within the plunger chamber 15 to be fed through the discharge hole 24 and the high-pressure chamber 28 into the orifice 30. At that time, the one way valve 21 for intake closes, preventing oil from leaking through the communication hole 20 and the intake passage 18 into the low-pressure chamber 19.

A bearing retainer 34 is press fitted into the housing 8 and is positioned by means of a snap ring 35. The bearing retainer 34 rotates jointly with the housing 8. The bearing retainer 34 is formed with a through-hole 36 opening to the low-pressure chamber 19. Needle bearings 37 and 38 are interposed between the bearing retainer 34 and the valve 27 and between the bearing retainer 34 and the main shaft 13, respectively. An oil seal 39 intervenes between the bearing retainer 34 and the main shaft 13, for preventing oil from flowing out.

An accumulator piston 40 is slidably provided outside the bearing retainer 34 to define an accumulator chamber 41 for absorbing any thermal expansion or contraction of oil. The accumulator chamber 41 opens to the low-pressure chamber 19 via the through-hole 36 of the bearing retainer 34.

O-rings 42 and 43 are interposed between the accumulator piston 40 and the housing 8 and between the accumulator piston 40 and the bearing retainer 34, respectively. The outer peripheral end of an accumulator retainer 44 is firmly secured to the housing 8. A return spring 45 intervenes between the accumulator retainer 44 and the bottom of the accumulator piston 40. A rear bearing 47 is disposed on the outer periphery of the bearing retainer 34 so that the bearing retainer 34 is supported on the differential gear case 4 by way of the rear bearing 47. The opening of the main shaft 13 is provided with an oil groove 48 for lubrication and with a sealing member 49.

FIG. 5 is a sectional view of the principal part including the connection between the rotor and the valve of FIG. 4 illustrated in an enlarged and exclusive manner. The rotor 12 is fitted via splines to the main shaft 13 located on the rear wheel driven shaft side. Therefore, the rotor 12 rotates jointly with the main shaft 13 and with the driven shaft side including the rear wheels. The rotor 12 and the valve 27 are positioned by a pin 32 and are coupled together by means of a bolt 33 acting as a connecting member. The valve 27 can thus rotate jointly with the rotor 12, the main shaft 13 and the rear wheel driven shaft. Rotations of the valve 27 are in synchronism with rotations of the rear wheels which are driven wheels by way of the bolt 33, the pin 32, the rotor 12 and the main shaft 13 in this manner, so that the point at which the weight 51 provided in the valve 27 operates is determined by the number of rotations of the rear wheels. Thus, even when only the propeller shaft 50 side rotates at a high speed, e.g., upon the escape from any difficult situations, the weight 51 will not work and cut off the transmission torque to the rear wheels since the valve 27 connects directly to the main shaft 13 associated with the rear wheels without any direct connection to the propeller shaft 50. In other words, the number of rotations at which the weight 51 works is determined by the number of rotations of the rear wheels which are driven wheels, so that it becomes possible to achieve a torque cut depending on the actual vehicle velocity.

The operative functions will now be described. In FIGS. 4 and 5, when there arises no rotational difference between the housing shank 2 having the cam face 9 and the rotor 12, the plunger 16 will not work, resulting in no torque transmission. At that time, the plunger 16 is pressed against tha cam face 9 by the action of the return spring 17. Then, when there occurs a rotational difference between the housing shank 2 and the rotor 12, the plunger 16 in its discharge stroke is axially thrust in by the cam face 9 of the housing shank 2. Oil residing in the plunger chamer 15 presses the one-way valve 25 for discharge seated on the valve seat of the discharge hole 24 in the rotor 12 to open the discharge hole 24, and enters the high-pressure chamber 28 of the valve 27. At that time, the one-way valve 21 for intake remains seated on the valve seat of the plunger chamber 15, closing the communication hole 20. Thus, oil within the plunger chamber 15 is prevented from leaking throught the intake passage 18 into the low-pressure chamber 19. Oil displaced into the high-pressure chamber 28 is fed through the orifice 30 and the low-pressure chamber 19 into the intake passage 18. At that time, resistance of the orifice 30 causes a rise of oil pressure in the high-pressure chamber 28, the discharge hole 24 and the plunger chamber 15, resulting in the occurencec of a reaction force of the plunger 16. Rotation of the housing shank 2 against this plunger reaction force of torque, which is transmitted between the housing shank 2 and the rotor 12. Further rotation of the housing shank 2 causes an intake stroke in which the one-way valve 21 for intake opens the communication hole 20 to allow oil within the low-pressure chamber 19 to flow through the intake passage 18 and the communication hole 20 into the plunger chamber 15, with the result that the plunger 16 returns along the came face 9 of the housing shank 2.

Figure 6:
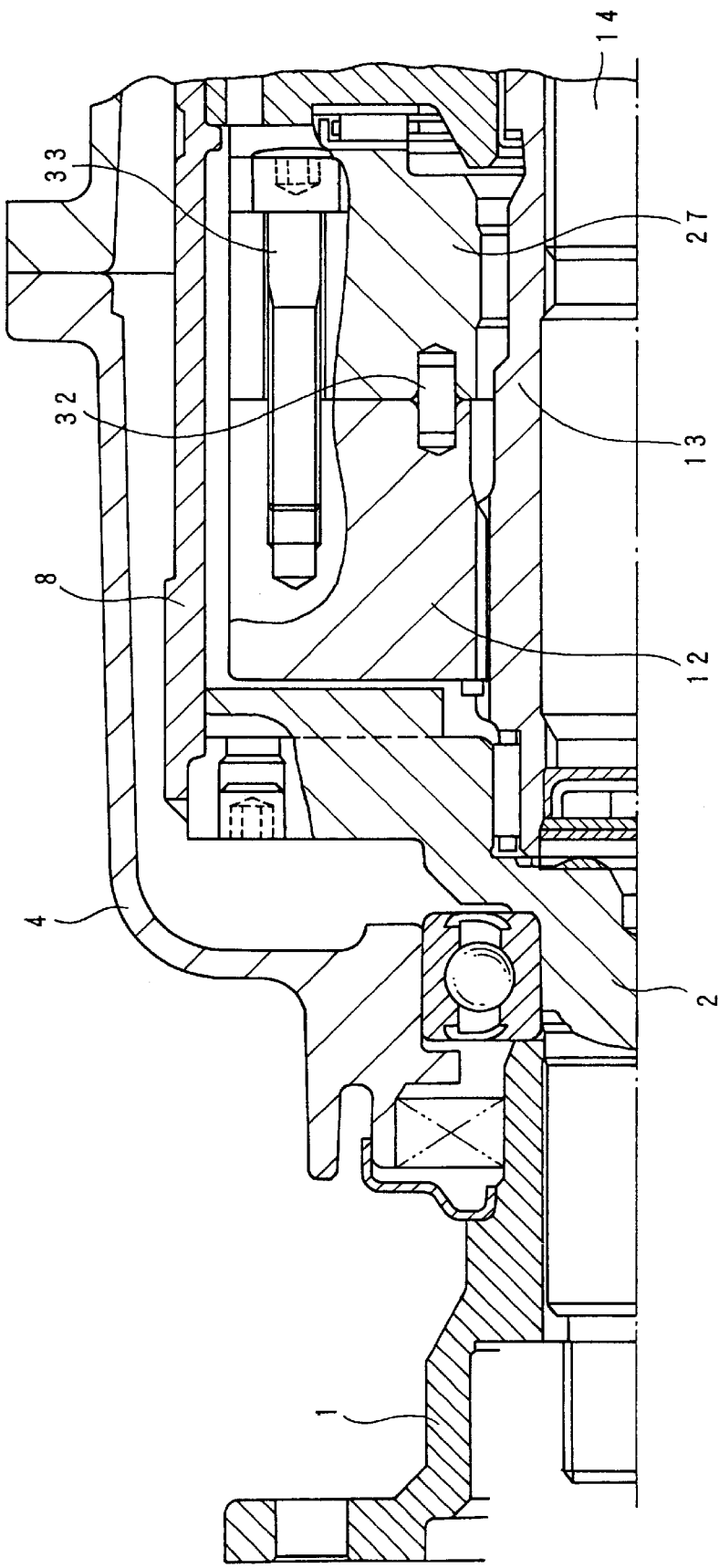
FIG. 6 is a sectional view showing the connection between a rotor and a valve of FIG. 4 in an exclusive manner.

In the embodiment of FIG. 6, the rotor 12 and the valve 27 are coupled together by means of the pin 32 and the bolt 33 so that the rotor 12 can rotate jointly with the valve 27. To this end, the rotor 12 is spline fitted to the main shaft 13 associated with the rear wheel driven shaft so that the number of rotations of the valve 27 can synchronize with the rotations of the rear wheels by way of the bolt 33, the pin 32, the rotor 12 and the main shaft 13. The point at which the weight 51 provided in the valve 27 works is thus determined by the number of rotations in the rear wheel side. In particular, even when the only front wheels acting as driving wheels and only the propeller shaft side rotate at a higher speed e.g., upon the escape from any difficult situations, the weight 51 will not work since the valve 27 connects directly to rotor 12 and the main shaft 13 side without any direct connection to the housing 8 and the propeller shaft 50. Thus, even when only the front wheels acting as the driving wheels and only the propeller shaft side rotate at a higher speed, any torque is not cut off. As a result, torque can be cut off depending on the proper vehicle velocity any influence of the rotational difference between the front and rear wheels.

Figure 7:
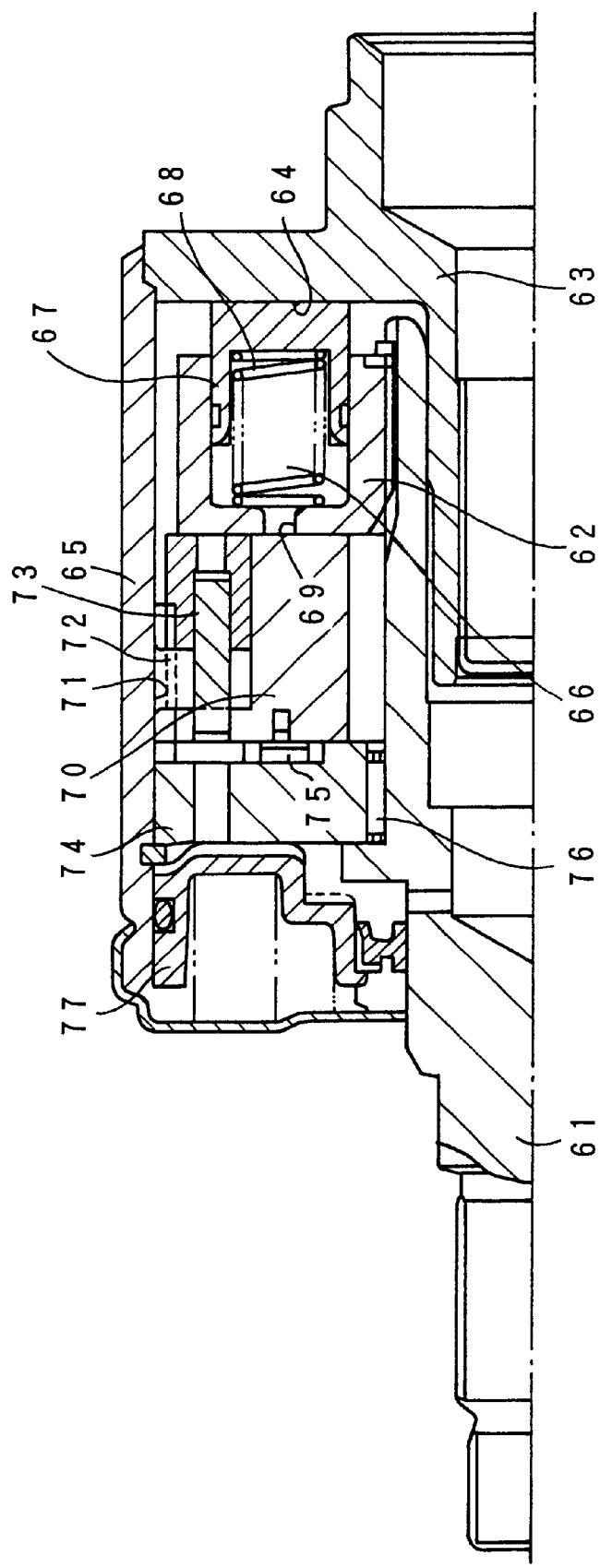
FIG. 7 is a half section of another embodiment of the present invention.

FIG. 7 is a sectional view showing another embodiment of the present invention, which is characterized as opposed to FIG. 4 in that the rotor of the hydraulic power transmission joint is coupled to the front wheel driving shaft associated propeller shaft, with the housing coupled to the rear wheel driven shaft associated main shaft.

In FIG. 7, a rotor 62 is spline fitted to an input shaft 61 coupled to the front wheel driving shaft side. The rotor 62 rotates jointly with the input shaft 61. An output shaft 63 coupled to the rear wheel side has a cam face 64 formed on its inner side. A housing 65 is coupled to an output shaft 63 and rotates jointly with the output shaft 63. The rotor 62 is formed with a plurality of axially extending plunger chambers 66 which accommodate a plurality of plungers 67 slidably by way of return springs 68. The rotor 62 is further formed with a plurality of intake/discharge holes 69 communicating with the plunger chambers 66. A rotary valve 70 is formed with intake ports, intake passages and discharge ports (not shown), and further with communication grooves communicating with the discharge ports. The rotary valve 70 has a positioning protrusion 72 adapted to engage with a notch 71 formed in the inner periphery of the housing 65 so that the rotary valve 70 can be coupled to the housing 65 by engagement of the protrusion 72 with the notch 71. The rotary valve 70 provides a timing member for determining the timing to open or close the intake/discharge holes 69, with the notch 71 and the protrusion 72 making up a positioning mechanism for restraining the phase relationship between the output shaft 63 and the rotary valve 70.

The rotary valve 70 is provided with a weight 73 which operates depending on the vehicle velocity for torque cutoff. The structure for the torque cutoff by the weight 73 is the same as that shown in FIG. 3. When the plunger 67 is in its intake stroke, a positional relationship is established in which the intake ports of the rotary valve 70 communicate with the intake/discharge holes 69 of the rotor 62, allowing oil to flow through the orifices, intake ports, intake passages not shown and the intake/discharge holes 69 of the rotor 62 into the plunger chambers 66. When the plunger 67 is in its discharge stroke, a reverse relationship to that of the intake stroke is established in which the intake/discharge holes 69 of the rotor 62 communicate with the communication grooves by way of the discharge ports of the rotary valve 70.

A bearing retainer 74 rotates jointly with the housing 65. A thrust needle bearing 75 intervenes between the bearing retainer 74 and the rotary valve 70. A needle bearing 76 is interposed between the bearing retainer 74 and the input shaft 61. An accumulator piston 77 serves to absorb any thermal expansion and contraction of oil.

In this embodiment of FIG. 7, the propeller shaft extending from the front differential gear is coupled to the input shaft 61 for input of the driving force and transmission thereof to the rotor 62, whereas the rotary valve 70 fitted with the weight 51 is engaged with the housing 65 coupled to the rear wheel driven shaft. Therefore, the point at which the weight 51 operates is determined by the number of rotations of the rear wheel driven shaft side. Since the number of rotations at which the weight operates is determined by the rear wheel (driven wheel) side in this manner, it is possible to effect a torque cutoff depending on the vehicle velocity without any influence of the rotational-speed difference between the front and rear wheels.

According to the present invention as set forth hereinabove, the valve having the weight which operates at a predetermined number of rotations for torque cutoff is coupled to the rotor or the housing of the joint for connection of the driven shaft acting as rear wheel side. The number of rotations of the torque cutoff valve is determined by the number of rotations of the rear wheels connecting to the driven shaft. Therefore, any torque cutoff can be effected depending on the vehicle velocity without being affected by any rotational differences between the front and rear wheels. Thus, torque is prevented from being cut off, e.g., upon the escape from any difficult situations.

It will be appreciated that the present invention is not limited to the above embodiments and that it covers any appropriate variants without impairing its objects and advantages. It will also be appreciated that the present invention is not restricted by the numerical values shown in the above embodiments.

What is claimed is:

1. A hydraulic power transmission joint disposed between a driving shaft and a driven shaft which are capable of relative rotations, for transmitting torque depending on rotational-speed differences between said driving shaft and said driven shaft, said hydraulic power transmission joint comprising:

a housing coupled to said driving shaft and having a cam face formed on an inner side of said housing;

a rotor coupled to said driven shaft and rotatably housed in said housing, said rotor including a plurality of axially extending plunger chambers;

a plurality of plungers each accommodated reciprocatively under a pressing force of a return spring in a respective one of said plurality of plunger chambers, said plurality of plungers being operated by said cam face upon relative rotations between said driving shaft and said driven shaft;

an orifice for causing oil discharged by a displacement of each of said plungers to create a flow resistance to impart a high pressure to an interior of each of said plunger chambers, said orifice allowing torque transmitted from said housing to said rotor to be generated by a reaction force of said plunger;

a valve which when a predetermined number of rotations is reached, operates to cut off torque; and a coupling member for coupling said rotor coupled to said driven shaft and said valve together, said coupling member allowing rotations of said valve to be in synchronism with rotations of said driven shaft.

2. A hydraulic power transmission joint according to claim 1, wherein said valve includes a weight which when a predetermined number of rotations are reached, rotates around its center of rotation by a centrifugal force to drain off a high-pressure oil residing within each of said plunger chambers.

3. A hydraulic power transmission joint according to claim 1, wherein said driving shaft comprises a propeller shaft extending from a front differential gear, and wherein said driven shaft comprises an input shaft of a rear differential gear.

* * * * *